United States Patent Office 2,886,558
Patented May 12, 1959

2,886,558

PREPARATION OF POLYMERS CONTAINING CARBOXY GROUPS FROM POLYMERS OF ACRYLAMIDE

Henry Z. Friedlander, Scarsdale, N.Y., assignor to American Cyanamid Company, New York, N.Y., a corporation of Maine No Drawing. Application August 17, 1953
Serial No. 374,817

7 Claims. (Cl. 260—89.7)

This invention relates to certain new and useful improvements in the preparation of polymers containing carboxy groups, and more particularly polymers containing both carboxylic amide (hereinafter for brevity often designated simply as "amide") and alkali-metal carboxylate groups. Specifically the invention is concerned with an improved method of producing an acrylamide polymer wherein from 10 to 70 percent, and more commonly from 10 to 60 percent, of the amide groups initially present therein have been converted into alkali-metal carboxylate (e.g., sodium carboxylate, potassium carboxylate, etc.) groups.

In practicing the present invention, the aforementioned polymers are produced by a method which comprises heating an aqueous solution at a temperature ranging from near the reflux temperature at atmospheric pressure to a temperature below the decomposition temperature of the starting acrylamide polymer and of hydrolysis products thereof. This aqueous solution comprises (1) an acrylamide polymer containing amide groups selected from the class consisting of those represented by the formulas—$CONH_2$, —$CONHR$ and —$CONRR'$, where R and R' each represents a lower alkyl radical, and (2) an amount of an alkali-metal hydroxide which is chemically equivalent to that required for effecting the desired percentage of conversion of the said amide groups to alkali-metal carboxylate groups. Illustrative examples of lower alkyl radicals represented by R and R' are methyl, ethyl, propyl, isopropyl, n-butyl, isobutyl, sec.-butyl, tert.-butyl, amyl, isoamyl, etc. The starting acrylamide polymers employed in practicing the present invention have an average molecular weight within the range of from about 3000 to about 250,000, and preferably from about 5000 to about 150,000 as determined on a Brookfield viscosimeter standardized with samples which also were determined osmometrically. The reaction is stopped when the desired percentage of conversion has been effected. By stopping the reaction substantially completely immediately, the conversion of the amide groups to alkali-metal carboxylate groups is almost quantitative. This may be done in various ways. For example, the reaction can be stopped substantially completely by chilling the reaction mass immediately at least to room temperature, such as to a temperature of from about 5° C. to about 20° or 25° C.; or by immediately neutralizing the reaction mass with a strong acid or its obvious equivalent.

My invention also provides a method of producing a series of hydrolyzed acrylamide polymers of increasing degrees of hydrolysis and wherein the overall effect, from the first to the last of the series, results in a conversion of from 10 to 70 percent of the amide groups in the starting acrylamide polymer into alkali-metal carboxylate groups. This embodiment of the invention comprises heating in a reaction zone an aqueous solution containing (a) an acrylamide polymer of the kind aforementioned and (b) an alkali-metal hydroxide in the chemically equivalent amount set forth above, the solution being heated in the reaction zone within the aforementioned temperature range. A portion of the acrylamide polymer is withdrawn from the reaction zone when the desired percentage of conversion has been effected, and further reaction (hydrolysis) of the withdrawn portion is stopped substantially completely, e. g., by chilling it immediately at least to room temperature or by neutralizing it immediately with a strong acid or the equivalent thereof. After adding to the solution remaining in the reaction zone an amount of an alkali-metal hydroxide which is chemically equivalent to that required for effecting the desired percentage of further conversion of amide groups of the partially hydrolyzed acrylamide polymer into alkali-metal carboxylate groups, the solution is heated as aforedescribed; then the steps of withdrawing from the reaction zone another portion of the acrylamide polymer when the desired percentage of conversion has been effected and of stopping the reaction of the withdrawn portion substantially completely are repeated. This step-wise hydrolysis technique may be carried out to marked advantage in producing a series of hydrolyzed acrylamide polymers of increasing degrees of hydrolysis in a single reaction vessel or unit merely by repeating the sequence of steps as often as is required in order to obtain the aforementioned conversion of from 10 to 70 percent of the amide groups present in the starting acrylamide polymer into alkali-metal carboxylate groups.

It was known prior to my invention that copolymers containing both carboxylic amide and carboxylic acid or salt groups could be produced by copolymerization of two ethylenically unsaturated monomers in which one of the said groups was present in one of the starting comonomers and the other group in the other comonomer, e. g., by copolymerizing acrylamide and acrylic acid. This method of preparing polymers containing both amide and carboxylic acid or salt groups has many practical disadvantages, some of which result from the fact that the monomeric acid is difficult to obtain in a pure state and because it requires special care in storing and handling since it is noxious, corrosive and unstable. Furthermore, it is extremely difficult and, in fact, almost impossible in commercial practice to make uniform copolymers containing a precise ratio of amide and carboxylic acid or salt groups by copolymerization technique. This is because of the many critical factors that influence the combining tendency of the comonomers to form copolymers, among which may be mentioned the type of copolymerization technique employed (e.g., bulk, solution, emulsion, bead, etc.), time and temperature of reaction, initiator or catalyst or catalyst system employed, ratio of comonomers with respect to each other, ratio of total monomers to the liquid medium in which copolymerization is being effected, and other influencing factors. Thus, when copolymerization is effected in aqueous media some of the ethylenically unsaturated amide becomes hydrolyzed to the acid or salt thereof, the degree of hydrolysis likewise varying with the polymerization conditions (e.g., time, temperature, concentration of monomers in the aqueous media, degree af acidity or alkalinity, etc.). Despite the utmost care and effort to obtain a specific copolymer containing both amide and carboxylic acid or salt groups in a predetermined ratio, the product is generally, at best, one composed of long-chain polymeric molecules having a broad range of compositions which vary widely from the mean composition of the polymeric product. This method has the additional disadvantage that at least two different comonomers are required as starting materials, thereby further adding to the cost of the final product since more equipment is needed to store and handle the initial reactants.

It also was suggested prior to my invention, for instance in British Patent No. 475,671, that an insoluble polymerization product prepared from methacrylic acid amide (methacrylamide) could be rendered water-soluble by treatment with a particular, dilute caustic soda solution for 2 hours at 30° C. and then for 3 hours at 60° C. The content of carboxylic acid, more particularly in the form of the salt thereof, which is present in such a water-soluble polymerization product, and in all others contemplated by the patentee, is from 0.5 to 5 percent by weight of the polymeric material. Such polymerization products are entirely different both in their chemical constitution and in their properties from those resulting from the method of the instant invention.

It is a primary object of the present invention to provide a rapid and economical method of preparing acrylamide polymers wherein from 10 to 70 percent of the amide groups initially present therein have been converted into alkali-metal carboxylate groups, and wherein the latter are present in the product in a predetermined ratio with respect to the remaining amide groups.

Another object of the invention is to provide a method of producing the aforementioned polymers which obviates the use of noxious, relatively expensive acrylic acid or an alkali-metal salt thereof; and, also, the difficulties and objections attendant with the use of a comonomer of uncertain purity.

Another object of the invention is to provide a method of producing the aforementioned polymers whereby one obtains products of substantially uniform and unvarying composition so that, in their many useful applications in industry, there will be no appreciable deviation from the desired end results due to lack of uniformity in the composition of the polymer.

Still other objects of the invention will be apparent to those skilled in the art from the following more detailed description thereof.

These and other objects are attained by practicing the method hereinafter described.

The present invention is based on my discovery that substantially uniform polymers wherein from 10 to 70 percent of the amide groups initially present therein have been converted into alkali-metal carboxylate groups can be made in a precise and simple manner by causing the calculated equivalent of an alkali-metal hydroxide to react with an acrylamide polymer of the kind described in the second paragraph of this specification, at as high a temperature and for as short a period of time as is practical, and while the said acrylamide polymer is dissolved or dispersed in an aqueous medium, and stopping the reaction (as, for instance, by using positive physical or chemical means to end the reaction substantially completely) when the desired percentage of conversion has been effected.

The starting acrylamide polymer is prepared by any of the methods now well-known to those skilled in the art.

Any of the alkali-metal hydroxides can be used, for example sodium hydroxide, potassium hydroxide, lithium hydroxide, etc.

The desired products, of uniform (substantially uniform) composition, are obtained by causing the exact amount of alkali-metal hydroxide chemical equivalent to the amount of alkali-metal carboxylate groups desired in the product to react at high temperature, preferably at or near the reflux temperature of the reaction mass, with the aqueous solution (or dispersion) of the starting acrylamide polymer in the shortest time possible to effect the reaction quantitatively. The reaction is stopped, for example, by withdrawing the reaction mass from the hot reaction vessel and then, for instance, (a) either chilling the mass immediately to room temperature or (b) bringing it immediately to neutrality by adding a strong acid, preferably a mineral acid, in an amount sufficient to effect this result. Examples of acids that can be used, as desired or as conditions may require, are: sulfuric, phosphoric, hydrochloric, hydrobromic, nitric, sulfamic, di- and trichloroacetic, etc. Instead of the acids themselves their obvious equivalents can be employed, as for instance salts which are hydrolyzable to form strong acids, e.g., ammonium bisulfate, ammonium dihydrogen phosphate, etc. The acid or its equivalent is preferably added in the form of a dilute aqueous solution.

The optimum temperature of reaction generally falls within the range of 90° to 98° C. at atmospheric pressure. The time of reaction within this temperature range is the shortest time required to effect the desired quantitative conversion of amide to alkali-metal carboxylate groups, and is generally not less than 5 minutes nor more than 60 minutes, e.g., from 10 to 40 or 50 minutes. Higher temperatures can, of course, be employed by carrying out the reaction under superatmospheric pressure, e.g., at a pressure of from 20 to 100 or 150 pounds per square inch, or higher, but in all cases the temperature employed should be below the decomposition temperature of the starting acrylamide polymer and of the hydrolysis products thereof. If superatmospheric pressures and temperatures substantially above about 98° C. be used, then the time of reaction may be even shorter than the 5-minute period mentioned hereinbefore, for instance from 1 to 2 or 3 minutes.

The use of an alkali-metal hydroxide likewise is important in carrying the present invention into effect. Hydrolysis of the starting acrylamide polymer can be effected with other alkaline, water-soluble reagents such as the methyl and ethyl amines, the various ethanolamines, and other water-soluble metallic hydroxides, but if any of such reagents be substituted for the alkali-metal hydroxide then again the quantitative precision of the method is not attained. Similarly, the use of acidic reagents as a means of effecting partial hydrolysis is possible, but is not preferred because, for one reason, the acidic, partially hydrolyzed polymeric product itself can cause additional hydrolysis and impair the desired quantitative conversion of amide to carboxyl groups.

In order that those skilled in the art may better understand how the present invention can be carried into effect, the following example is given by way of illustration and not by way of limitation. All parts and percentages are by weight.

EXAMPLE

This example illustrates the preparation of a series of acrylamide polymers wherein from 10 to 59 percent of the amide groups present in the starting polymer have been converted into alkali-metal carboxylate groups.

In a reaction vessel fitted with a stirrer and condenser and heated by steam were placed 2712 parts of a solution consisting of 240 parts of an acrylamide polymer (having an average molecular weight of about 25,000) and 2472 parts of water at pH 7. This solution had an absolute (Brookfield) viscosity at 26° C. of 790 centipoises. The solution was heated to 94° C. and 4.0 parts of sodium hydroxide was added. The pH rose immediately to 10.7. After 20 minutes the pH had dropped to 9.3, and Sample 1 (250 parts of solution) was withdrawn at 95° C. Then 6.0 parts of sodium hydroxide was added, and the pH rose to 11.3. After 25 minutes the pH had dropped to 9.7 and again 250 parts of solution (Sample 2) was withdrawn at 95° C. Five (5) parts of sodium hydroxide was added, and the pH rose to 10.6. Twenty-five minutes later the pH had fallen to 9.7, and at 90°C. Sample 3 amounting to 250 parts was withdrawn. At this time 5.0 parts of sodium hydroxide was added, and the pH rose to 10.8 at 92° C. Forty minutes later at 95° C. 250 parts of solution (Sample 4) was withdrawn; the pH was 9.7. Ten (10.0) parts of sodium hydroxide was then added, and the pH rose to 12.5. Forty minutes later at 94° C. Sample 5 amounting to 250 parts of solution was withdrawn at pH of 10.0. Next 7.5 parts of sodium hydroxide was added, the pH rising to 12.7. Forty minutes later, at 92° C. and at a pH of 10.5, 250 parts of solution (Sample 6) was withdrawn. Finally 9.0 parts of sodium hydroxide was added, the pH rising to 12.9. Forty-five minutes later at 93° C. and a pH of 10.8 Sample 7 amounting to 250 parts was withdrawn. Sample 7 was brought to a pH of 9.0 with 0.5 N hydrochloric acid. Each of the other samples was neutralized to a pH of 7.0 with 0.5 N hydrochloric acid, the amount required being of the order of 10 to 15 parts.

The results are tabulated below:

*Table*

| Sample | Percent—CONH$_2$ Groups Hydrolyzed to Sodium Carboxylate Groups | | Percent Solids | Absolute Viscosity (Brookfield). Centipoises |
|---|---|---|---|---|
| | Calc. | Actual | | |
| 1 | | | 9.2 | 680 |
| 2 | 11 | 12 | 9.8 | 840 |
| 3 | 17 | 17 | 10.0 | 900 |
| 4 | 22 | 21 | 10.3 | 1,000 |
| 5 | 30 | 30 | 11.0 | 1,300 |
| 6 | 41 | 39 | 11.5 | 1,350 |
| 7 | 60 | 59 | 11.0 | 1,650 |

Instead of a polymer of $CH_2=CH-CONH_2$ as in the foregoing example, one can use a polymer of an N-mono- or -di-(lower alkyl) acrylamide. Examples of lower alkyl substituents have been given hereinbefore. Also, instead of stopping the reaction by neutralization as in the example, the reaction can be stopped substantially completely immediately by placing the withdrawn portions in an ice bath.

For some purposes the viscous solution of neutralized polymeric product can be employed without change. For other uses it is advantageous to isolate the dry solid, by any suitable method, e.g., by drum-drying, spray-drying, etc. The following is illustrative of the isolation of the solid product by drum-drying:

The solution of polymeric end-product was introduced to the nip between the rolls (set 0.001 inch apart) of a double drum-drier. The rolls were 7 inches long and 6 inches in diameter. They were operated at 150° C. and 5 r.p.m. The viscous material was rotated 200° around the circumference of the roll and was removed therefrom with a doctor blade. The drum-dried sheets were then pulverized to a powder that passed through a standard 200-mesh screen.

I claim:
1. The method of producing a polymer of acrylamide in which polymer from 10 to 70 percent of the amide groups initially present therein have been converted into alkali-metal carboxylate groups, said method comprising heating an aqueous solution at a temperature ranging from near the reflux temperature at atmospheric pressure to a temperature below the decomposition temperature of the starting acrylamide polymer and of hydrolysis products thereof, said solution comprising (1) an acrylamide polymer containing amide groups selected from the class consisting of those represented by the formulas —CONH$_2$, —CONHR and —CONRR', where R and R' each represents a lower alkyl radical, said polymer having an average molecular weight within the range of from about 3000 to about 250,000 and the monomer thereof having a hydrogen atom attached directly to its alpha carbon atom, and (2) an amount of an alkali-metal hydroxide which is chemically equivalent to that required for effecting the desired percentage of conversion of the said amide groups to alkali-metal carboxylate groups, and stopping the reaction when the desired percentage of conversion has been effected.

2. A method as in claim 1 wherein the alkali-metal hydroxide is sodium hydroxide.

3. A method as in claim 1 wherein the reaction is stopped by chilling the reaction mass immediately at least to room temperature.

4. A method as in claim 1 wherein the reaction is stopped by immediately neutralizing the reaction mass with a strong acid.

5. A method as in claim 1 wherein the aqueous solution is heated at atmospheric pressure and at a temperature between 92° C. and the reflux temperature.

6. The method of producing a polymer of acrylamide in which polymer from 10 to 60 percent of the amide groups initially present therein have been converted into sodium carboxylate groups, said method comprising heating an aqueous solution containing (1) an acrylamide polymer wherein the amide groups thereof are unsubstituted, which has an average molecular weight within the range of from about 5000 to about 150,000, and the monomer of which has a hydrogen atom attached directly to its alpha carbon atom, and (2) an amount of sodium hydroxide which is chemically equivalent to that required for effecting the desired percentage of conversion of the said amide groups to sodium carboxylate groups, said solution being heated at atmospheric pressure and at a temperature between 92° C. and the reflux temperature for a period of from 5 minutes to 1 hour, and stopping the reaction within the aforementioned time period when the desired percentage of conversion has been effected.

7. The method of producing a series of hydrolyzed polymers of acrylamide of increasing degrees of hydrolysis and wherein the overall effect, from the first to the last of the series, results in a conversion of from 10 to 70 percent of the amide groups present in the starting acrylamide polymer into alkali-metal carboxylate groups, said method comprising (1) heating in a reaction zone an aqueous solution containing (a) an acrylamide polymer containing amide groups selected from the class consisting of those represented by the formulas —CONH$_2$, —CONHR and —CONRR', where R and R' each represents a lower alkyl radical, said polymer having an average molecular weight within the range of from about 3000 to about 250,000 and the monomer thereof having a hydrogen atom attached directly to its alpha carbon atom, and (b) an amount of an alkali-metal hydroxide which is chemically equivalent to that required for effecting the desired percentage of conversion of the said amide groups to alkali-metal carboxylate groups, said solution being heated in said reaction zone at a temperature ranging from near the reflux temperature at atmospheric pressure to a temperature below the decomposition temperature of the starting acrylamide polymer and of hydrolysis products thereof; (2) withdrawing from the reaction zone a portion of the acrylamide polymer when the desired percentage of conversion has been effected; (3) neutralizing the withdrawn portion immediately with a strong acid; (4) adding to the solution remaining in the reaction zone an amount of an alkali-metal hydroxide which is chemically equivalent to that required for effecting the desired percentage of further conversion of amide groups of the partially hydrolyzed acrylamide polymer into alkali-metal carboxylate groups; (5) heating the said solution as aforedescribed; and then repeating steps (2) and (3) thereby to obtain a hydrolyzed acrylamide polymer wherein the percentage of conversion of amide groups to alkali-metal carboxylate groups is higher than that which characterizes the product obtained at the end of step (3).

References Cited in the file of this patent

Arcus: Article in Journal of The Chemical Society (London), November 1949, pages 2732–2736. Copy in Scientific Library.